United States Patent [19]

Feintuch et al.

[11] Patent Number: 5,212,565

[45] Date of Patent: May 18, 1993

[54] METHOD FOR REDUCING AMOUNT OF STORED DIGITAL IMAGE DATA WITHOUT DEGRADING A RECONSTITUTED IMAGE

[75] Inventors: Martin Feintuch, Washington Township, County of Bergen; Christopher Ivory, Glen Rock, both of N.J.

[73] Assignee: Allied-Signal Inc., Morris Township, Morris County, N.J.

[21] Appl. No.: 615,191

[22] Filed: Nov. 19, 1990

[51] Int. Cl.⁵ ............................................. H04N 1/415
[52] U.S. Cl. ..................................................... 358/433
[58] Field of Search .................... 358/433, 432, 426; 382/56, 50-53

[56] References Cited

U.S. PATENT DOCUMENTS 5,051,840  9/1991  Watanabe et al. .................. 358/433
5,060,285 10/1991  Dixit et al. ......................... 358/433
5,070,532 12/1991  Faul et al. .......................... 358/433
5,093,872  3/1992  Tutt .................................... 358/433

Primary Examiner—Stephen Brinich
Attorney, Agent, or Firm—Howard G. Massung

[57] ABSTRACT

Image area data in an uncompressed data field is digitized as binary data and subsectioned into data bit blocks. The subsections are compressed whereby each subsection is represented in terms of its predominant data values plus non-redundant data occurrences. Several predominant values are chosen from the subsection of interest. Each of the predominant values is assigned a bit code and data values from the subsection that are identical to a predominant value are assigned a code corresponding to the predominant value. Uncoded remaining data values and the coded data values are stored in a variable length record so that each data location within the record spatially corresponds to the location of the original data in the uncompressed data field.

12 Claims, 11 Drawing Sheets

FIG. 4

| CODE (BINARY) | SUB-BLOCK SIZE | BLOCKS PER 64x64 FIELD |
|---|---|---|
| 0000 | 64x64 | 1 |
| 0001 | 32x32 | 4 |
| 0010 | 16x16 | 16 |
| 0011 | 8x8 | 64 |
| 0100 | 4x4 | 256 |
| 0101 | 64x1 | 64 |
| 0110 | 32x1 | 128 |
| 0111 | 16x1 | 256 |
| 1000 | 8x1 | 512 |
| 1001 | 1x64 | 64 |
| 1010 | 1x32 | 128 |
| 1011 | 1x16 | 256 |
| 1100 | 1x8 | 512 |

FIG. 6

CODE 0: (000)

-A SUB-BLOCK WHICH CONTAINS ALL THE SAME PIXEL VALUES CAN BE ENCODED AS 7 BITS AS SHOWN.

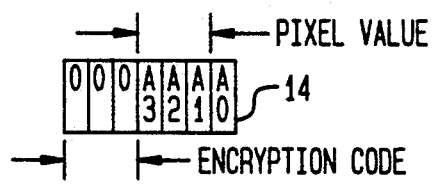
← PIXEL VALUE
← ENCRYPTION CODE

MAX. REDUCTION RATIO

$$\frac{4 \times (\# \text{ OF BITS PER SUB-BLK})}{3 + 4}$$

CODE 1: (001)

-A SUB-BLOCK WHICH CONTAINS ONE PREDOMINANT PIXEL VALUE PLUS OTHER PIXEL VALUES CAN BE ENCODED AS SHOWN.

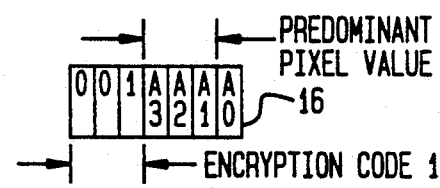
← PREDOMINANT PIXEL VALUE
← ENCRYPTION CODE 1

$$\frac{4 \times (\# \text{ OF BITS PER SUB-BLK})}{3 + 4 + (\# \text{ OF PIXELS PER SUB-BLK})}$$

VARIABLE LENGTH BIT ARRAY →
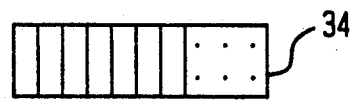

"1": PIXEL LOCATION CONTAINS PREDOM. VALUE.

"0": USE FOLLOWING 4 BITS FOR PIXEL VALUE.

CODE 2: (010)

–A SUB-BLOCK WHICH CONTAINS TWO PREDOMINANT PIXEL VALUES PLUS OTHER PIXEL VALUES CAN BE ENCODED AS SHOWN.

$$\frac{4\times(\text{\# OF BITS PER SUB-BLK})}{11+(\text{\# OF PIXELS PER SUB-BLK})}$$

VARIABLE LENGTH BIT ARRAY ⟶

"1": PIXEL LOCATION CONTAINS PREDOM. VALUE 1.

"01": PIXEL LOCATION CONTAINS PREDOM. VALUE 2.

"00": USE FOLLOWING 4 BITS FOR PIXEL VALUE.

FIG. 8

CODE 3: (011)
—A SUB-BLOCK WHICH CONTAINS THREE PREDOMINANT PIXEL VALUES PLUS OTHER PIXEL VALUES CAN BE ENCODED AS SHOWN.

$$\frac{4 \times (\text{\# OF BITS PER SUB-BLK})}{15 + 2 \times (\text{\# OF PIXELS PER SUB-BLK})}$$

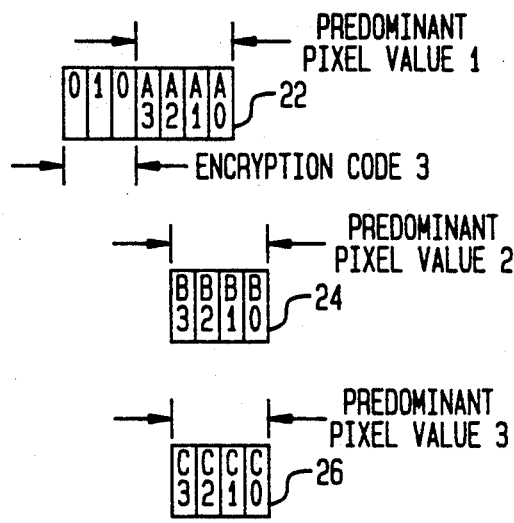

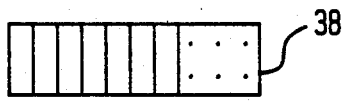

VARIABLE LENGTH BIT ARRAY ⟶

"01": PIXEL LOCATION CONTAINS PREDOM. VALUE 1.

"10": PIXEL LOCATION CONTAINS PREDOM. VALUE 2.

"11": PIXEL LOCATION CONTAINS PREDOM. VALUE 3.

"00": USE FOLLOWING 4 BITS FOR PIXEL VALUE.

4 x SUB-BLOCK DIMENSIONS
―――――――――――――――――――
3 + 4 x SUB-BLOCK DIMENSIONS

METHOD FOR REDUCING AMOUNT OF STORED DIGITAL IMAGE DATA WITHOUT DEGRADING A RECONSTITUTED IMAGE

BACKGROUND OF THE INVENTION

Paper navigational charts used by pilots of modern aircraft are being replaced by "electronic maps" in the form of digitally stored data systems.

In digitally stored data systems, paper charts are digitally reproduced and stored in binary form in bulk memory. In order to achieve an image resolution comparable to that of otherwise used optically based film strip systems, a significant amount of digital data must be collected and stored in what amounts to a vast amount of memory in the form of a disc (optical or magnetic) or a solid state read only memory (ROM).

Digital image data, as in the case of paper navigational charts, is highly correlated and thus contains a significant amount of redundant data. Accordingly, the digital image data is usually compressed. Most prior art compression methods store only non-redundant data, thus reducing storage requirements and bit rates. These methods result in degradation of a reconstituted image due to losses experienced during compression.

Accordingly, it is the object of the present invention to reduce the amount of digital data required to be stored without degrading the reconstituted image.

SUMMARY OF THE INVENTION

This invention contemplates a digital image data compression method, wherein an image area data field, digitized as a $512 \times 512 \times 4$ bit binary data field, is sub-sectioned into $64 \times 64 \times 4$ bit data blocks. Each of the subsections (sixty-four in all) is compressed so as to represent the individual subsection in terms of its predominant data values plus any non-redundant data occurrences. Several predominant data values are chosen from the subsection of interest, assuming that 0-3 of such values exist, and are assigned a 1 or 2 bit code. Every data value from the original data subsection that is identical to a predominant data value is assigned the 1 or 2 bit code corresponding to the predominant value. Remaining data values are stored uncoded, along with the coded data, in a variable length record. Each data location within this record spatially corresponds to the location of the original data in the uncompressed data field. Assuming that the proportion of data that is redundant exceeds that which is random, data compression ratios of large magnitude can be achieved.

BRIEF DESCRIPTION OF THE DRAWINGS

FIG. 3A is a diagrammatic representation of the arbitrary $4 \times 4 \times 4$ bit matrix.

FIG. 4 is a tabular representation illustrating thirteen possible sub-blocking schemes and associated encryption codes.

FIG. 6 is a diagrammatic representation illustrating two methods of data compaction and associated codes.

FIG. 8 is a diagrammatic representation illustrating still another method of data compaction and associated codes.

DETAILED DESCRIPTION OF THE INVENTION

Figure 1:
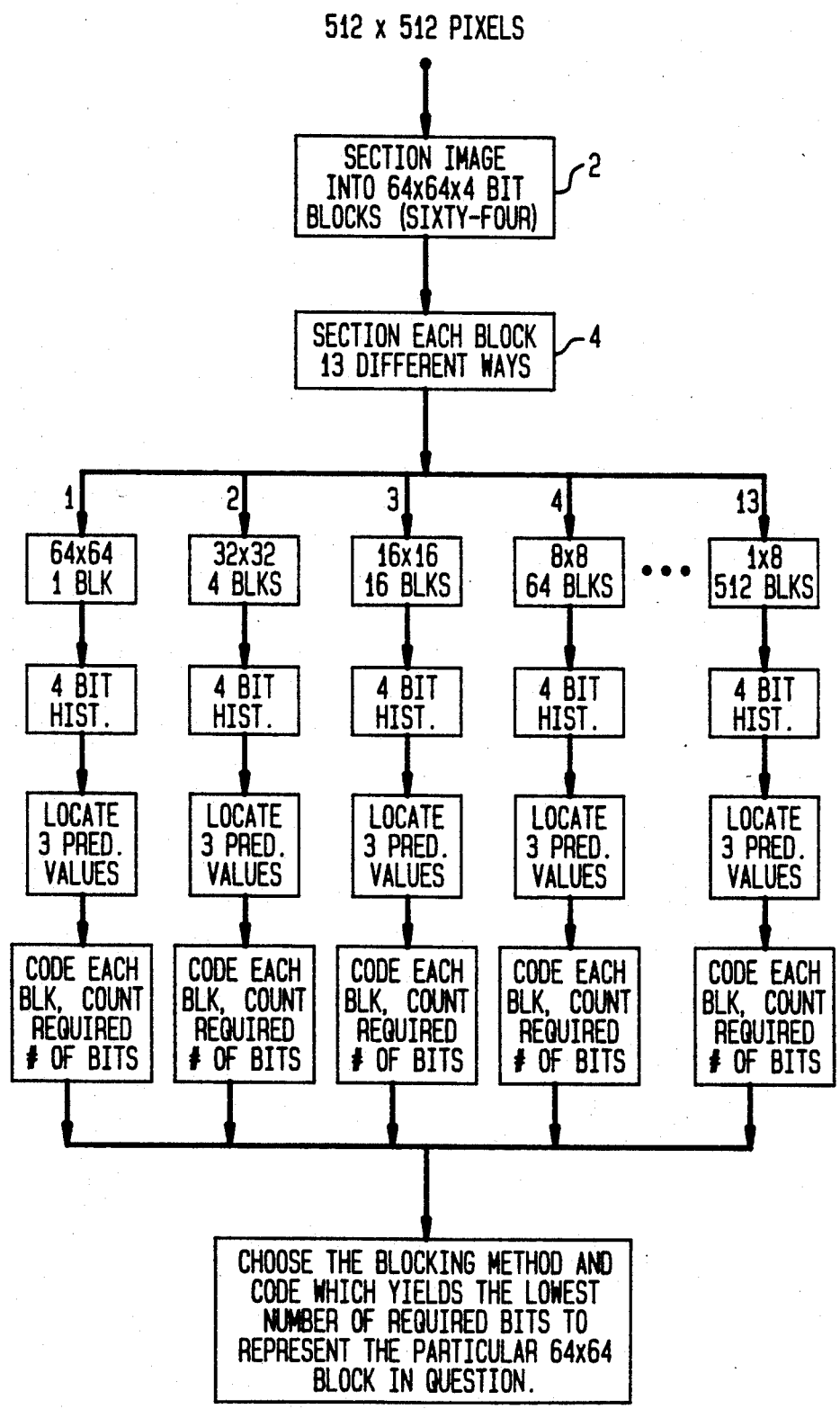
FIG. 1 is a flow chart representation illustrating the method by which the invention encodes a given data field.

With reference to FIG. 1, digitized image data in the form of $512 \times 512$ pixels (picture elements) is inputted to an algorithm. Each pixel carries a numerical weight of zero through fifteen (16 levels) and as such can be represented by four binary bits.

Figure 2:
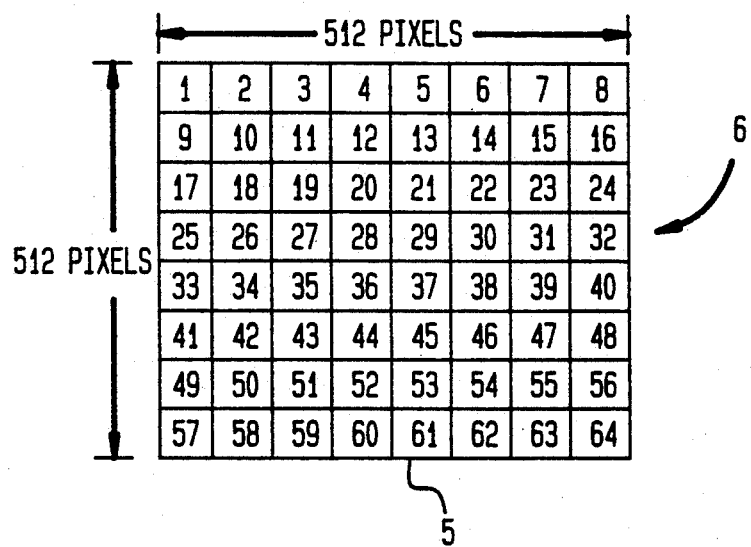
FIG. 2 is a diagrammatic representation illustrating the subsectioning of a $512 \times 512 \times 4$ bit data field into sixty-four $64 \times 64 \times 4$ bit sections.
Figure 10:
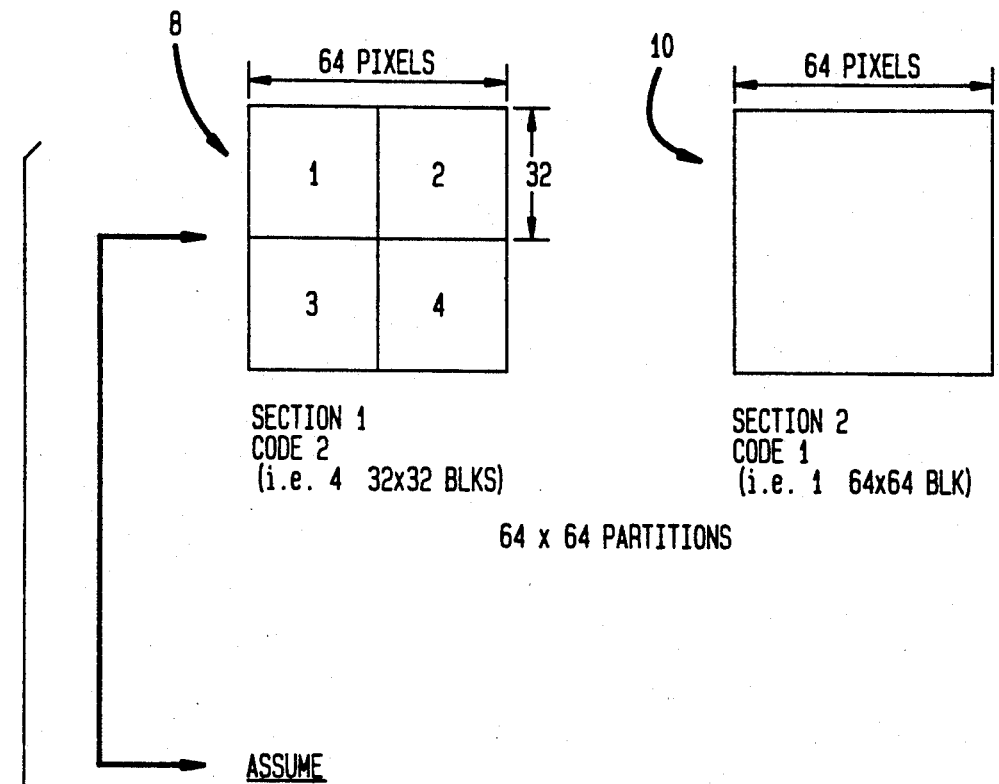
FIG. 10 is a diagrammatic representation illustrating two $64 \times 64$ sub-blocks with known characteristics represented in terms of binary records.
Figure 10:
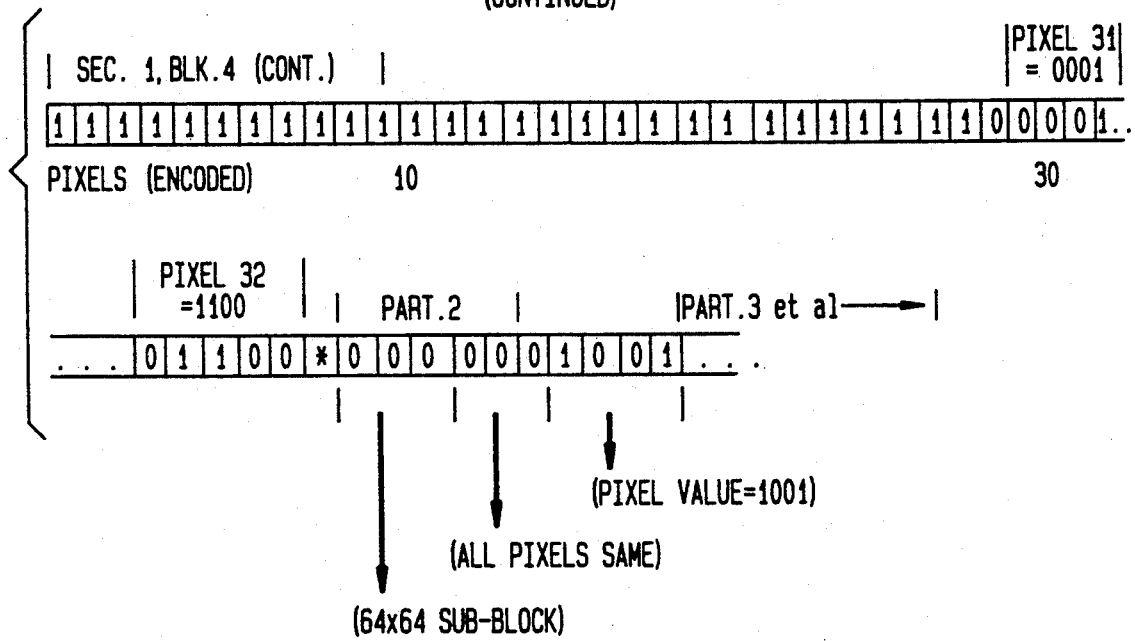

The inputted digitized image data is sectioned into sixty-four $64 \times 64 \times 4$ bit blocks at 2. Each block such as 5 is spatially oriented to retain the integrity of an original image 6 (FIG. 2). Each block 5 is sectioned one of thirteen ways at 4 (FIG. 1). Each of the sixty-four blocks is eventually stored as a varying length record in a manner such that the first record corresponds to an upper left hand block 8 of the image, the second record corresponds to a block 10 immediately to the right of block 8, and so on (FIG. 10).

Figure 5:
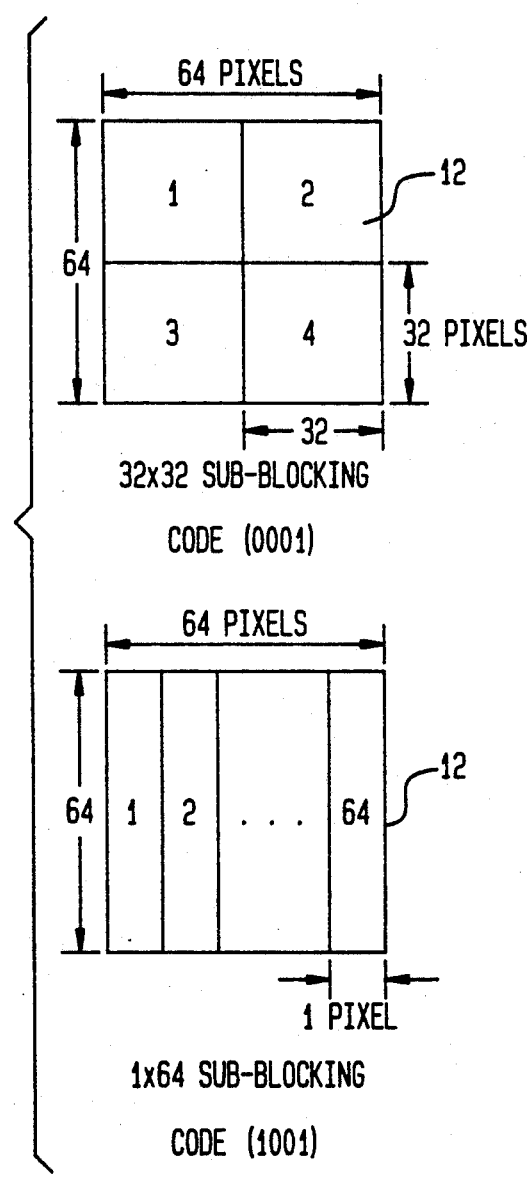
FIG. 5 is a diagrammatic representation illustrating the sub-blocking of an arbitrary $64 \times 64 \times 4$ bit data field using two of the thirteen available sub-blocking schemes.

As particularly shown in FIG. 5, each of the sixty-four subsections are divided into integral sub-blocks such as 12, wherein each sub-block retains its spatial orientation so as not to destroy the integrity of the section. The thirteen different sub-blocking schemes (FIG. 1) and a corresponding 4 bit code for each $64 \times 64$ subsection which identifies the manner in which the subsection is to be sub-blocked, are available as illustrated in FIG. 4.

Figure 3:
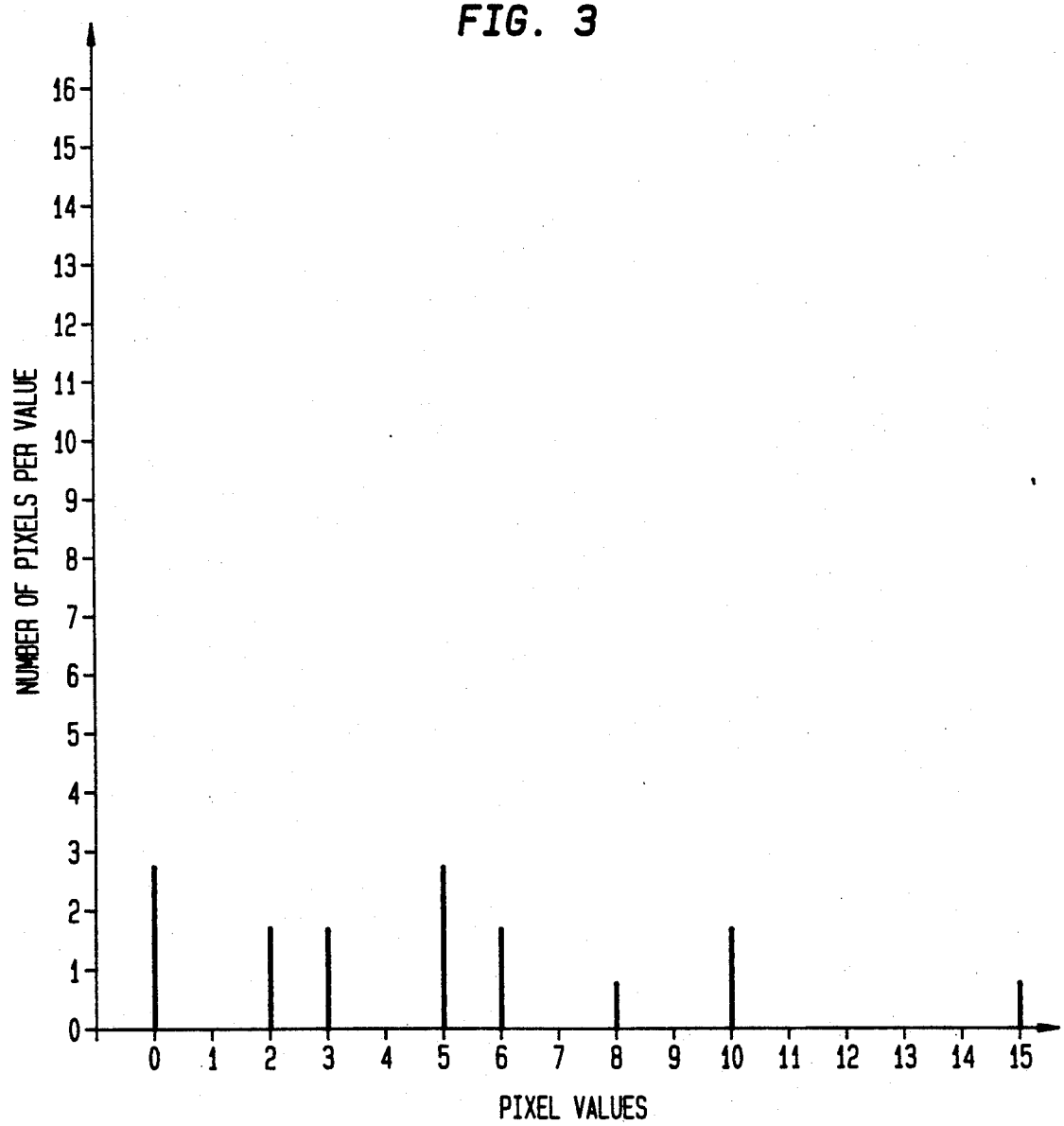
FIG. 3 is a diagrammatic representation illustrating a histogram operation applied to an arbitrary $4 \times 4 \times 4$ bit matrix.

The histogram of FIG. 3, which correlates pixel values with the number of pixels per value, illustrates a method whereby the number of pixels of like value is tabulated to determine which pixels occur most often in any one image area in order to determine the predominant values as well as the number of predominant values available in an image area of interest. A histogram operation is performed on each sub-block 12.

A pixel encoding algorithm is performed for each sub-block in accordance with one of five methods.

A first method (code 0) assumes that all the pixels in a sub-block are identical. Thus, only seven bits, three for the encryption code (000) and four for the pixel value (AAAA) are required as at 14 in FIG. 6. The first method is performed if the result of the histogram (FIG. 3) is such that one predominant pixel value is found and that the number of pixels of this value equal the total number of pixels in the particular sub-block 12.

A second method (code 1) assumes that one pixel value predominates and that any remaining pixel values are random. The data record representing the sub-block in compressed form is illustrated in FIG. 6. The first three bits (001) represent the compression method (encryption) code and the next four bits (AAAA) represent the predominant pixel value as at 16. Each following pixel value is such that if the value is identical to the predominant value then the pixel is represented as a binary bit "1". If the following pixel value is not identical to the predominant value then the pixel value is represented as a binary bit "0" followed by the pixel's four bit data value.

Figure 7:
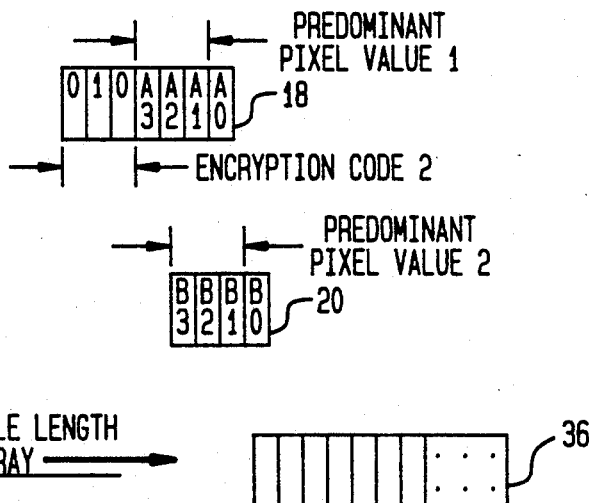
FIG. 7 is a diagrammatic representation illustrating another method of data compaction and associated codes.

A third method (code 2) assumes that two pixel values predominate and that any remaining pixels are random. The data record illustrating the sub-block in compressed form is as shown in FIG. 7. The first three bits (010 at 18) represent the compression method (encryption) code; the second four bits (AAAA at 18) represent the first predominant value; the next four bits (BBBB at 20) represent the second predominant value; and each following bit pattern is such that if the pixel value in question is identical to the first predominant value then the pixel is represented by a binary "1"; if the following pixel is identical to the second predominant value then the pixel value is represented as a binary "01", and if the pixel value is not identical to either, then it is represented by a two bit code "00" followed by the four bit value of the pixel.

A fourth method (code 3) assumes that three pixel values predominate and that any remaining pixel values are random. FIG. 8 represents a typical portion of the data record of the compressed sub-block. The first three bits represent the compression (encryption) method code (010 at 22); the second four bits (AAAA at 22) represent the first predominant value; the next four bits (BBBB at 24) represent the second predominant value; and the following 4 bits (CCCC at 26) represent the third predominant value. Finally, the compressed form of the pixel data with bit code "01" represents all values equal to the first predominant value. Bits "10" represent the second predominant value; bits "11" represent the third predominant value; and the remaining bit pattern is such that if the pixel value in question is unlike any of the predominant values then it is represented by the bit code "00" followed by the value of the pixel.

Figure 9:
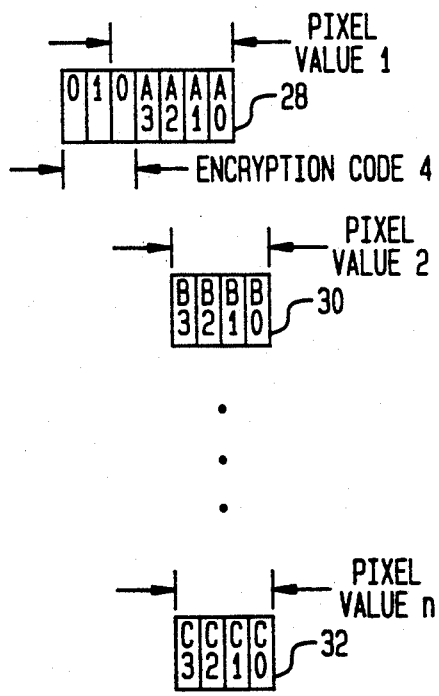
FIG. 9 is a diagrammatic representation illustrating yet another method of data compaction and associated codes.

A fifth method assumes the sub-block to consist of random pixel values. They typical record organization of a sub-block is represented in FIG. 9. The first three bits ("010" at 28) identify the sub-block as one which consists of random data and the remaining bits (at 28, 30 and 32) are the actual values of the sub-block pixels.

The remaining data values (bits) which are uncoded along with the coded data values are stored in variable length records as at 34, 36 and 38 in FIGS. 6, 7 and 8, respectively. Each data location within these records corresponds to the location of the original data in the uncompressed data field (FIG. 2).

At the conclusion of the compaction operations for each section i.e., examination of the thirteen sub-blocking schemes (FIG. 1) and the five compaction operations for each sub-blocking (FIGS. 6–9), an examination of the total number of bits required to represent the 64×64×4 bit section (FIG. 2) is calculated for each sub-blocking scheme and its corresponding compaction methods, and the scheme that yields the lowest number of bits for the partition in question (i.e., greatest compression) is identified and the section is serially encoded as required by the compaction guidelines.

FIG. 10 illustrates a 64×64×4 bit section being stored according to the second sub-block method (FIG. 6) (i.e., four 32×32 sub-blocks), with each secondary sub-block (32×32) being encoded according to its characteristics as heretofore described.

With the above description of the invention in mind, reference is made to the claims appended hereto for a definition of the scope of the invention.

What is claimed is:

1. A digital image data compression method, comprising:

digitizing an uncompressed image area data field including digitizing said image area data field in the form of 512×512 pixels, wherein each pixel carries a numerical weight of zero through fifteen so as to have sixteen levels and can be represented by four binary bits;

sectioning the digitized, uncompressed image area data field into a plurality of data blocks including sectioning the digitized image area data field into sixty-four 64×64×4 bit blocks, wherein each block is spatially oriented for retaining the integrity of an original image, and sub-sectioning each of the sixty-four blocks by one of a plurality of schemes, wherein each of the sixty-four blocks is divided into integral sub-blocks, with each of the sub-blocks retaining its spatial orientation;

compressing the plurality of data blocks for representing each block in terms of its predominant data values and non-redundant occurrences including selecting predominant data values from each block, and encoding the selected predominant data values and the data values that are identical to a selected predominant data value including assigning a data bit code to each of the selected predominant data values and assigning to data values that are identical to a predominant value a data bit code corresponding to that of the predominant value; and storing remaining uncoded data values and the coded data values in a variable length record so that each data location within the record corresponds to the location of the data in the uncompressed image area data field.

2. A method as described by claim 1, including:
assigning a data bit code for each sub-block, said sub-block data bit codes having code bits and predominant pixel value code bits.

3. A method as described by claim 2, including:
assigning the data bit code for each sub-block in accordance with the assumption that all pixel values are identical.

4. A method as described by claim 2, including:
assigning the data bit code for each sub-block in accordance with the assumption that one pixel value predominates and that any remaining pixel values are random.

5. A method as described by claim 2, including:
assigning the data bit code for each sub-block in accordance with the assumption that two pixel values predominate and that any remaining pixel values are random.

6. A method as described by claim 2, including:
assigning the data bit code for each sub-block in accordance with the assumption that three pixel values predominate and the remaining pixel values are random.

7. A method as described by claim 2, including:
assigning the data bit code for each sub-block in accordance with the assumption that all of the pixel values are random.

8. A method as described by claim 3, wherein:

the first three bits of the sub-block data bit code represent the code and the final four bits represent the predominant pixel value.

9. A method as described by claim 4, wherein:
the first three bits of the sub-block data bit code represent the code;
the next four bits represent the predominant pixel value; and
each following bit pattern is such that if the pixel value is identical to the predominant value the pixel value is represented as a binary "1", and if the value is not identical to the predominant value the pixel value is represented as a binary "0" followed by the pixel's four bit predominant value.

10. A method as described by claim 5, wherein:
the first three bits of the sub-block data bit code represent the code;
the next four bits represent a first predominant value;
the following four bits represent a second predominant value; and
each following bit pattern is such that if the pixel value is identical to the first predominant value then the pixel value is represented by a binary "1", if the pixel value is identical to the second predominant value then the pixel value is represented as a binary "01", and if the pixel value is not identical to one of said first and second predominant values, the pixel value is represented by a two bit code "00" followed by the pixel's four bit predominant value.

11. A method as described by claim 6, wherein:
the first three bits of the sub-block data bit code represent the code;
the next four bits represent the first predominant pixel value;
the following four bits represent the second predominant pixel value;
the next following four bits represent the third predominant pixel value; and
each following bit pattern is such that if the pixel value is unlike any of the predominant values the pixel value is represented by a two bit code "00" followed by the pixel's four bit predominant value.

12. A method as described by claim 7, wherein:
the first three bits of the sub-block data bit code identify the sub-block as one wherein all of the pixel values are random; and
the following bits are the actual pixel predominate values.

* * * * *